March 21, 1944.  R. L. BROWNLEE  2,344,593
CLUTCH DRIVE
Filed April 6, 1942  2 Sheets-Sheet 1
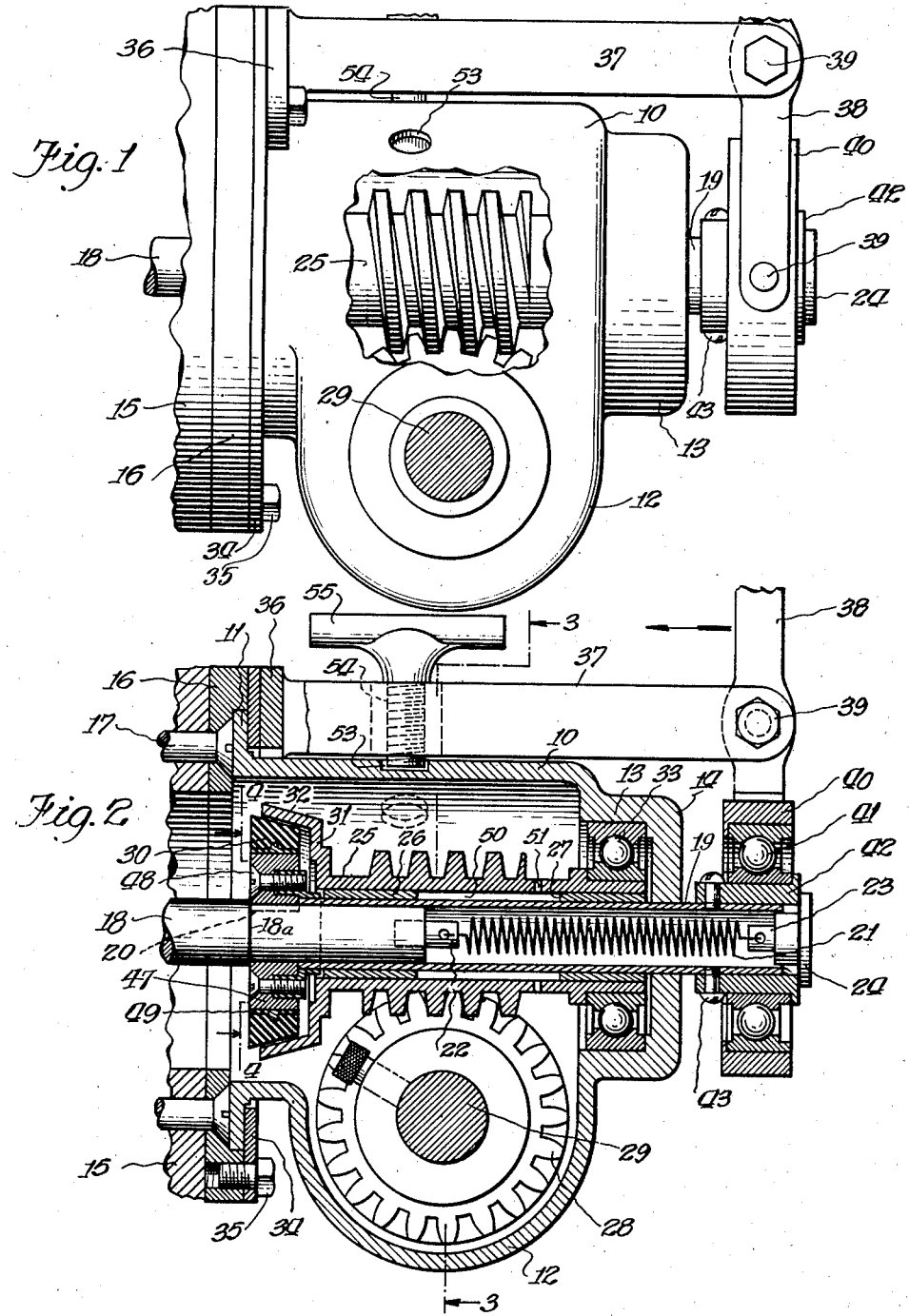
INVENTOR:
Robert L. Brownlee
BY Stewart Batcheller
ATTORNEYS.

March 21, 1944.  R. L. BROWNLEE  2,344,593
CLUTCH DRIVE
Filed April 6, 1942   2 Sheets-Sheet 2
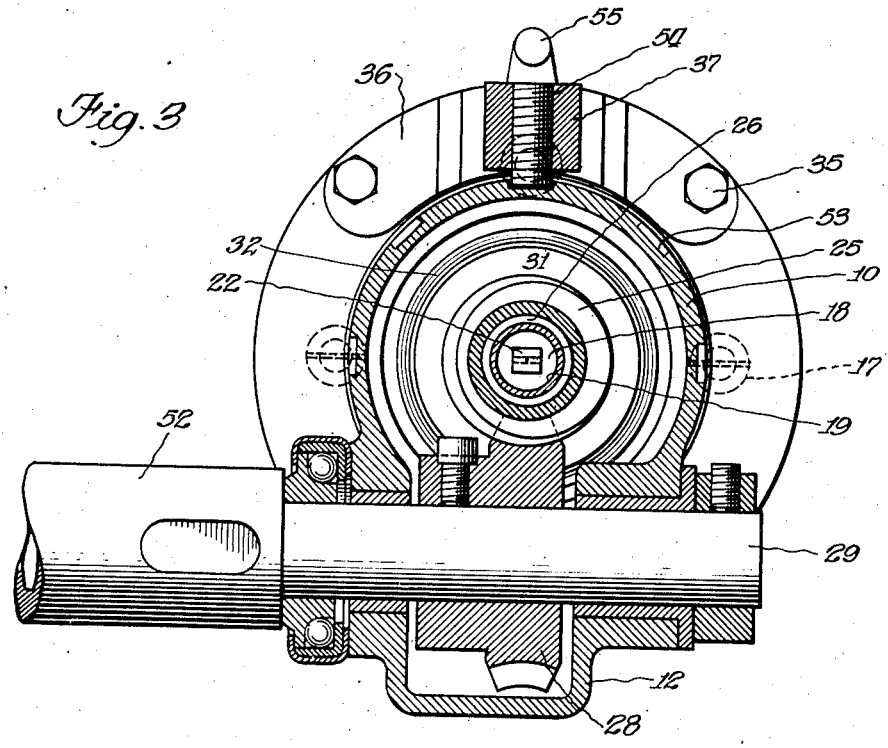
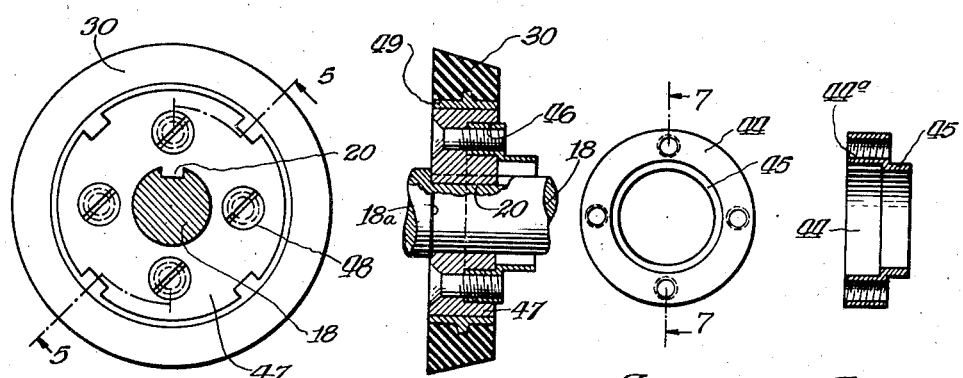
INVENTOR:
Robert L. Brownlee
BY Stevens + Batchelor
ATTORNEYS.

Patented Mar. 21, 1944

2,344,593

UNITED STATES PATENT OFFICE 2,344,593

CLUTCH DRIVE

Robert L. Brownlee, Chicago, Ill.

Application April 6, 1942, Serial No. 437,915

10 Claims. (Cl. 192—66)

My invention relates to power deliveries from small engines, portable electric motors and the like, for the operation of drills and other tools, and my main object is to provide a drive containing a clutch which is manually controllable to connect or disconnect the drive at will.

A further object of the invention is to provide a drive of the above character which contains a gradually-engageable clutch to relieve the power delivery of shock or undue strain when the drill or other tool encounters an obstruction or more than ordinary resistance.

Another object of the invention is to apply the novel drive in the form of a small and compact unit attachable directly to the crank case or housing of the engine or motor and having external clutch actuating means.

A still further object of the invention is to incorporate a control for the clutch drive which passes through the latter to a point externally of the housing containing the drive, whereby to permit the housing to be fully enclosed for the retention of a lubricant.

An important object of the invention is to utilize the power delivery as one bearing or support for the drive and supplement such support with a second and independent bearing, thus providing the drive with a dual and balanced support.

With the above objects in view, and any others which may suggest themselves from the description to follow, a better understanding of the invention may be had by reference to the accompanying drawings, in which—

Figure 1 is a side elevation of the unit incorporating the novel drive, partly broken away to expose a portion of the interior;

Fig. 2 is a longitudinal vertical section of the unit, partly in elevation;

Fig. 3 is a section on the line 3—3 of Fig. 2;

Fig. 4 is a section of the driving clutch member on the line 4—4 of Fig. 2;

Fig. 5 is a section on the line 5—5 of Fig. 4;

Fig. 6 is a front face view of a coupling ring; and

Fig. 7 is a section on the line 7—7 of Fig. 6.

Referring specifically to the drawings, 10 denotes the housing of the novel clutch drive, such housing being generally cylindrical and with its front end open. Such end has a circular outward flange 11. The middle portion of the housing is extended with a downward pocket 12; and the rear portion is somewhat reduced, as indicated at 13, terminating with a solid wall 14.

The application of the housing 10 to the crank case or housing 15 of the engine, motor or other power unit involves the interposition of a ring 16 as a facing for the engine or motor housing, such ring being secured thereto by bolts 17.

The shaft 18 of the engine or motor usually extends a short distance out of the same, and I utilize such shaft not only as the driving source for the power delivery, but also as a bearing for the frontal portion thereof. Since the power delivery also requires a bearing or support in the rear of the housing 10, I extend the drive shaft 18 rearwardly by means of a long sleeve 19. The latter is connected for rotation with the shaft 18 by a key 20 beyond the forward portion of the sleeve, which is mounted on the shaft. The sleeve is hollow rearwardly of the shaft, and affords room for a long coil spring 21. The forward end of the latter is secured to a stem 22 projecting from the shaft 18 while the rear end of the spring is connected to a similar stem 23 projected from an end cap 24.

Primarily, the sleeve 19 is employed as a bearing for a tubular worm 25 which surrounds the sleeve and is spaced therefrom by bushings 26 and 27. The worm is freely disposed for rotation with the bushings around the sleeve 19; and the rotation of the worm is transmitted to a worm gear 28 located in the pocket 12 and carried by a shaft 29 journaled in such pocket. A reduction drive is thus obtained from the worm 25, the direction of the drive being governed by that of the meshing threads, so that no extra part or external gearing is required to alter the mechanism for delivering the drive in the reverse direction.

The sleeve 19 and the worm 25 are also carriers of co-operative clutch elements. Thus, the sleeve carries the male or conical element 30, while the worm 25 is enlarged as indicated at 31 to form the female or receptive element 32 of the clutch. As indicated in Figure 2, the element 30 is normally spaced from the element 32; and the rearward movement of the element 30 will engage the clutch.

While the worm 25 is rotatable to deliver the drive to the worm gear 28, the worm is not movable longitudinally, as it is spaced from the housing reduction 13 by, and backed against a ball bearing 33. Therefore, the sleeve 19 assumes the rearward movement to engage the clutch; and I utilize the sleeve for the control of the clutch by extending the sleeve rearwardly through the back wall 14.

The housing flange 12 is secured to the ring 16 by a clamping ring 34, fastened by a series of bolts 35. To the ring 34 is attached by means of two of the bolts 35 a segment-shaped base 36 for a dual bracket 37 extending rearwardly over the housing 10. A vertical lever 38 extends between the rear ends of the bracket 37, making a pivot joint 39 with the same. The lever 38 extends downwardly to form the outer element 40 of a ball bearing shifter 41, the inner element 42 thereof being secured to the sleeve 19 by screws 43.

The spring 21 is of the tension type and draws on the cap 24, which bears on the rear face of the shifter element 42. The sleeve 19 is thus drawn forwardly to back the clutch element 30 out of the companion element 32, maintaining the clutch released normally. However, when the lever 38 is pushed in the direction of the arrow indicated in Figure 2, the sleeve 19 is drawn rearwardly with the effect of engaging the clutch.

The construction of the driving clutch member is illustrated more clearly in Figs. 4 to 7. Fig. 7 shows a coupling ring 44 whose rear portion 45 is welded or otherwise rigidly secured to the forward end of the sleeve 19. The ring 44 fits into an annular pocket 46 of a ring 47 which is formed with the key 20 and receives a series of bolts 48 from the front. These thread into tapped bores 44a made in the ring 44, serving to firmly attach the ring 47 to the ring 44. The ring 47 is normally held against a shoulder 18a of the shaft 18. The male clutch element 30 is of synthetic rubber composition and mounted on a metallic base ring 49, such ring being tightly driven into the ring 47 to complete the driving clutch member.

The bushings 26 are preferably of bronze to reduce friction; and they are widely spaced in order to provide a cavity 50 between the worm 25 and the sleeve 19 which may be filled with the lubricant contained in the housing 10 by passing through one or more perforations 51 in the worm.

Fig. 3 shows that the shaft 29 extends from the housing 10 with a chuck or holder 52 suitable for receiving a drill or auger bit (not shown). In order to set the angle of the drill or bit to the most convenient position for the work, the housing 10 is preferably made rotatable. Thus, the clamping ring 34 is not too tight to permit the flange 11 to slide when the housing is turned; and the periphery of the latter is made with a number of circularly spaced cavities 53 selectively engageable by the lower end of a screw 54 carried by the bracket 37 when the screw is advanced by turning a top handle 55. The housing 10 is therefore stationed at the selected point to maintain the drill or bit at the desired angle. This feature is shown as an adjunct to the drive unit, but no novelty is claimed for the same.

It will be evident from the above description that I have provided a unit which is small and compact to serve for the power delivery from the engine or motor to the desired tool. Moreover, the drive incorporates a clutch which is simple and gradually engageable, such clutch being controllable at will to engage the tool with the power drive or quickly disengage the same in case of an obstruction or undue resistance. Further, the control is not inside the housing between or adjoining the clutch elements, as is commonly the case, but passes through the center of the drive as an extension to a point outside or to the rear of the housing. Thus, the latter can be built compactly around the drive and filled with a permanent lubricant. Further, while the power drive primarily serves to actuate the running gear, the present development also employs it as one bearing or support therefor, and utilizes the extension or clutch controlling element as a companion bearing for the drive. Further, it is obvious that the clutch control may be reversed by making the spring 21 of the compression type, whereby it will normally maintain the clutch in the engaged position. Also, the direction of the thread on the worm 25 may be calculated to impose a rearward stress during the driving of the gear 28, so as not to transmit such stress in the direction of the engine. Finally, it is apparent that the novel drive is a compact and sturdy structure, capable of long life by reason of permanent lubrication, and serving as a cushioned intermediary or safety factor between the driving element and the tool.

While I have described the improved clutch drive along specific lines, it is apparent that minor changes or refinements may be made therein without departing from its principle, and I desire to consider such changes and refinements as coming within the scope and spirit of the appended claims.

I claim:

1. A power drive comprising a support, a drive shaft, an inner member longitudinally slidable on the shaft but rotatably joined thereto, an outer member freely rotatable about the inner member, a bearing for the outer member carried by the support and locking the same against longitudinal motion, driving and driven clutch elements carried by the inner and outer members respectively, and means to shift the inner member for the engagement of its clutch element with that of the outer member and transmit the motion of the drive shaft to the same.

2. The structure of claim 1, the clutch element of the outer member being at one end thereof, and said bearing at the other end.

3. The structure of claim 1, the clutch element of the outer member being at one end thereof, said bearing at the other end, a worm pinion formed by the member portion between said ends, and a worm gear meshed with said pinion to transmit a reduction drive from said shaft in either direction according to the direction of the meshing threads.

4. A clutch drive comprising a power unit extended with a drive shaft, a cup-like housing applied with its open end to said power unit and having its wall extended laterally with a pocket, an inner member longitudinally slidable on the shaft but rotatably joined thereto, an outer member freely rotatable about the inner member, a bearing for the outer member in the closed end-portion of the housing and locking said outer member against longitudinal motion, driving and driven clutch elements carried by the inner and outer members respectively, means to shift the inner member for the engagement of its clutch element with that of the outer member for transmitting the motion of the shaft to the same, said clutch elements being in the region of the inner end of the housing, a drive pinion formed by the intermediate portion of said outer member, and a gear situated in said pocket and meshed with the drive pinion to transmit a reduction drive from said shaft.

5. A clutch drive comprising a power unit extended with a drive shaft, a cup-like housing applied with its open end to said power unit and receiving said shaft in its entrance, a driving clutch element having a center tube non-rotatably mounted on the shaft but movable longitudinally of the same, a driven clutch element engageable by the driving clutch element when the latter is moved in a given direction, an extension of said center tube through the closed end of the housing, and control means applied to the external portion of the center tube.

6. A clutch drive comprising a power unit extended with a drive shaft, a cup-like housing applied with its open end to said power unit and receiving said shaft in its entrance, a driving clutch element joined for rotation with the shaft and movable longitudinally of the same, a driven clutch element engageable by the driving clutch element when the latter is moved in a given direction, an extension of said driving clutch element through the closed end of the housing, and control means applied to the external portion of said extension, said extension being a tube with its inner end portion slidable on the shaft, attaching means in the outer end portion of the tube, and a spring between the end of the shaft and said attaching means.

7. A clutch drive comprising a power unit extended with a drive shaft, a cup-like housing applied with its open end to said power unit and receiving said shaft in its entrance, a driving clutch element joined for rotation with the shaft and movable longitudinally of the same, a driven clutch element engageable by the driving clutch element when the latter is moved in the outward direction, an extension of said driving clutch element through the closed end of the housing, control means applied to the external portion of said extension, said extension being a tube with its inner end portion slidable on the shaft, attaching means in the outer end portion of the tube, and a spring between the end of the shaft and said attaching means to draw on the same and normally retain the driving clutch element in the disengaged position.

8. A clutch drive comprising a power unit extended with a drive shaft, a cup-like housing applied with its open end to said power unit and receiving said shaft in its entrance, a driving clutch element joined for rotation with the shaft and movable longitudinally of the same, a driven clutch element engageable by the driving clutch element when the latter is moved in a given direction, an extension of said driving clutch element through the closed end of the housing, and control means applied to the external portion of said extension, said extension being a tube slidable on the shaft, and a tubular shaft for the driven element concentrically surrounding said extension.

9. A clutch drive comprising a power unit extended with a drive shaft, a cup-like housing applied with its open end to said power unit and receiving said shaft in its entrance, a driving clutch element joined for rotation with the shaft and movable longitudinally of the same, a driven clutch element engageable by the driving clutch element when the latter is moved in a given direction, an extension of said driving clutch element through the closed end of the housing, and control means applied to the external portion of said extension, said extension being a tube slidable on the shaft, and a tubular shaft for the driven element concentrically surrounding said extension, said tubular shaft having a pinion development, and means in the housing meshed with said pinion for the transmission of motion therefrom.

10. A clutch drive comprising a power unit extended with a drive shaft, a cup-like housing applied with its open end to said power unit and receiving said shaft in its entrance, a driving clutch element joined for rotation with the shaft and movable longitudinally of the same, a driven clutch element engageable by the driving clutch element when the latter is moved in a given direction, an extension of said driving clutch element through the closed end of the housing, and control means applied to the external portion of said extension, said extension being a tube slidable on the shaft, and a tubular shaft for the driven element concentrically spaced around said extension, and longitudinally spaced bushings between the extension and the tubular shaft to rotatably support the latter on the extension, the tubular shaft being perforated for communication of a lubricant from the space in the housing to that between the bushings.

ROBERT L. BROWNLEE.